(No Model.)

J. F. GILLILAND.
GEARING.

No. 265,595. Patented Oct. 10, 1882.

UNITED STATES PATENT OFFICE.

JAMES F. GILLILAND, OF INDIANAPOLIS, INDIANA.

GEARING.

SPECIFICATION forming part of Letters Patent No. 265,595, dated October 10, 1882.

Application filed July 1, 1882. (No model.)

*To all whom it may concern:*

Be it known that I, JAMES F. GILLILAND, of the city of Indianapolis, county of Marion, and State of Indiana, have invented certain new and useful Improvements in Gearing, of which the following is a specification.

The object of my said invention is to produce a noiseless and inexpensive and at the same time strong and durable gearing. This object is accomplished by constructing two gear-wheels—one of metal and the other of rubber—in which the cogs of the metal wheel shall be comparatively small or thin and those of the rubber wheel comparatively large or thick.

Figure 1:
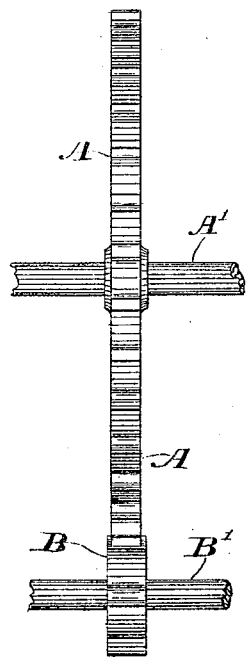
Figure 2:
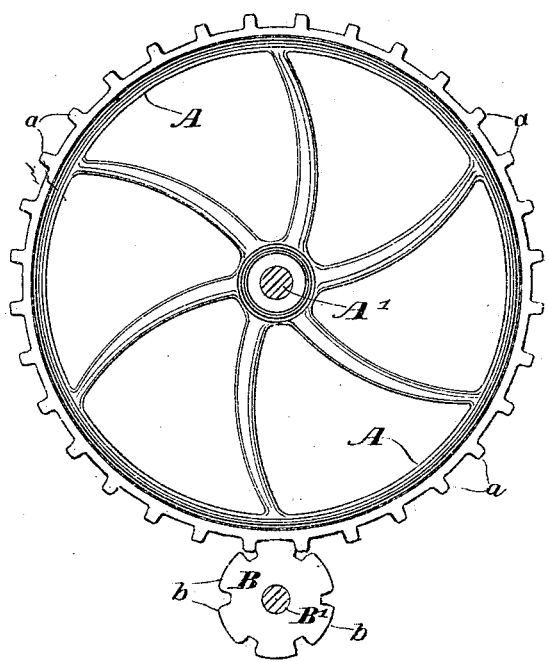

Referring to the accompanying drawings, which are made a part hereof, and on which similar letters of reference indicate similar parts, Figure 1 is a front elevation of a gear constructed in accordance with my said invention, and Fig. 2 is a side elevation of the same.

In said drawings, the portions marked A represent the metal gear-wheel, and those marked B the rubber gear-wheel. The wheel A is mounted on a shaft or axle, A', and is similar in form to any common spur-gear, except that the cogs $a$ are farther apart than usual, or of comparatively less size than the spaces between them. These wheels are produced very cheaply, being ordinarily cast from white-metal. Little or no finishing is necessary, as the cogs can be cast comparatively smooth, and any slight irregularities that may remain are of no importance, as the surfaces of the wheel B will yield sufficiently to accommodate them. Any other metal or material having the necessary strength and rigidity may, however, be employed, if desired. The wheel B is mounted on a shaft or axle, B', and is also similar in form to other spur-gears, except that the cogs $b$ are formed reversely to those of the wheel A, or of comparatively greater size than the spaces between them. This construction gives the cogs of these wheels strength substantially equal to that of those of the wheel A, notwithstanding the disparity in the strength of the material used. These wheels are also produced very cheaply, being ordinarily cast from a stiff or hardish quality of soft rubber in exactly the form required. Leather, however, or any other material having similar elastic or yielding qualities, can be used without departing from my invention.

This gearing has not only the attributes of an ordinary spur-gearing, but also, in a measure, those of a friction-gearing, as the ends of the thick cogs $b$ bear against the bottoms of the spaces between the thin teeth $a$, in the same manner as if the teeth $a$ and the spaces between the teeth $b$ were not present. This, together with the non-resonant character of the material of which especially the wheel B is composed, makes the gearing entirely noiseless, so far as gearing can be made noiseless.

The use to which I have applied this gearing and for which it is principally intended is that of driving the armature of a magneto-electric generator such as is used in call-signaling apparatus. I do not, however, limit myself to this use or any other, but may employ it wherever applicable and an inexpensive noiseless gearing is desired.

Having thus fully described my said invention, what I claim as new, and desire to secure by Letters Patent, is—

1. A gearing composed of a metal wheel having small cogs with wide spaces between them, and a rubber or similar wheel having large cogs with small spaces between them, substantially as set forth.

2. The combination of the metal wheel A, having thin cogs $a$ with wide spaces between them, and the rubber wheel B, having thick teeth $b$, which fit in between the thin teeth in the wheel A, and narrow spaces between them, which fit over the said thin teeth, the ends of said thick teeth $b$ and the bottoms of the spaces between the teeth $a$ also constituting friction-surfaces, substantially as set forth.

3. The combination of the wheels A and B, constructed as specified, to form a combined spur and friction gearing, substantially as set forth.

In witness whereof I have hereunto set my hand and seal at Indianapolis, Indiana, this 26th day of June, A. D. 1882.

JAMES F. GILLILAND. [L. S.]

In presence of—
C. BRADFORD,
E. W. BRADFORD.